(12) United States Patent
Kauper et al.

(10) Patent No.: US 9,662,719 B2
(45) Date of Patent: May 30, 2017

(54) DRILL BIT

(71) Applicant: KENNAMETAL, INC., Latrobe, PA (US)

(72) Inventors: Herbert Rudolf Kauper, Erlangen (DE); Juergen Schwaegerl, Vohenstrauss (DE)

(73) Assignee: KENNAMETAL, INC., Latrobe, PA (US)

( * ) Notice: Subject to any disclaimer, the term of this patent is extended or adjusted under 35 U.S.C. 154(b) by 0 days.

(21) Appl. No.: 14/762,095

(22) PCT Filed: Jan. 21, 2014

(86) PCT No.: PCT/US2014/012293
§ 371 (c)(1),
(2) Date: Jul. 20, 2015

(87) PCT Pub. No.: WO2014/116575
PCT Pub. Date: Jul. 31, 2014

(65) Prior Publication Data
US 2015/0360301 A1 Dec. 17, 2015

(51) Int. Cl.
*B23B 51/02* (2006.01)
*B23B 51/06* (2006.01)

(52) U.S. Cl.
CPC .............. *B23B 51/02* (2013.01); *B23B 51/06* (2013.01); *B23B 2250/12* (2013.01);
(Continued)

(58) Field of Classification Search
CPC ..... B23B 51/02; B23B 51/06; B23B 2251/18; B23B 2251/14; Y10T 408/9097; Y10T 408/45
See application file for complete search history.

(56) References Cited

U.S. PATENT DOCUMENTS 4,605,347 A * 8/1986 Jodock .................... B23B 51/02
408/224
4,983,079 A * 1/1991 Imanaga ................. B23B 51/02
408/144

(Continued)

FOREIGN PATENT DOCUMENTS

CN 1556734 A 12/2004
CN 201442193 U 4/2010
(Continued)

OTHER PUBLICATIONS

Korean Intellectual Property Office, "International Search Report for PCT/US2014/012293", Apr. 28, 2014, 5 pp.
Aug. 3, 2016—First Office Action—K-04143-CN-PCT.

*Primary Examiner* — Sunil K Singh
*Assistant Examiner* — Ryan Rufo
(74) *Attorney, Agent, or Firm* — Matthew S. Bedsole

(57) ABSTRACT

In order to ensure good guidance of a drilling tool at the start of a drilling operation and at the same time ensure a reliable evacuation of a center chip, in the drill bit, in a tool flank adjoining a respective main cutting edge, an additional point thinning is recessed in the region of a transverse cutting edge, which additional point thinning, extending in a principal direction from the tool flank, merges, with a convex course, into a chip flute. As a result of the convex design, an as far as possible homogeneous, edge-free transition into the chip flute is obtained. Since the point thinning is additionally made, the tool flank, even in the rear end facing away from the cutting edge, remains at a front axial position, so that a second land is effective for a reliable guidance of the bore already at an axially front position.

10 Claims, 3 Drawing Sheets

(52) U.S. Cl.
CPC ..... *B23B 2251/18* (2013.01); *B23B 2251/408* (2013.01); *Y10T 408/45* (2015.01); *Y10T 408/9097* (2015.01)

(56) References Cited

U.S. PATENT DOCUMENTS

| | | | |
|---|---|---|---|
| 5,378,091 A | 1/1995 | Nakamura | |
| 5,716,172 A * | 2/1998 | Nakamura | B23B 51/02 408/227 |
| 5,957,631 A | 9/1999 | Hecht | |
| 6,045,301 A | 4/2000 | Kammermeier | |
| 6,071,046 A | 6/2000 | Hecht | |
| 6,132,149 A * | 10/2000 | Howarth | B23B 51/02 408/229 |
| 6,988,859 B2 | 1/2006 | Borschert | |
| RE40,297 E | 5/2008 | Berglund | |
| 7,407,350 B2 | 8/2008 | Hecht | |
| 7,530,772 B2 | 5/2009 | Reinhardt | |
| 7,789,599 B2 | 9/2010 | Takikawa | |
| 8,021,088 B2 | 9/2011 | Hecht | |
| 8,430,609 B2 | 4/2013 | Frejd | |
| 8,556,552 B2 | 10/2013 | Hecht | |
| 8,784,018 B2 | 7/2014 | Pabel | |
| 8,840,347 B2 | 9/2014 | Aare | |
| 8,931,982 B2 | 1/2015 | Osawa | |
| 2003/0002941 A1 | 1/2003 | Borschert et al. | |
| 2003/0039522 A1 * | 2/2003 | Yanagida | B23B 51/02 408/230 |
| 2003/0147711 A1 | 8/2003 | Risen | |
| 2004/0067114 A1 * | 4/2004 | Stokey | B23B 51/0009 408/227 |
| 2006/0093449 A1 * | 5/2006 | Hecht | B23B 51/02 408/231 |
| 2007/0134071 A1 | 6/2007 | Reinhardt et al. | |
| 2008/0089753 A1 | 4/2008 | Takikawa | |
| 2009/0279965 A1 * | 11/2009 | Soittu | B23B 51/02 408/59 |
| 2010/0028098 A1 * | 2/2010 | Shaffer | B23B 51/02 408/230 |
| 2010/0054884 A1 * | 3/2010 | Masuda | B23B 51/02 408/230 |
| 2010/0322726 A1 | 12/2010 | Glimpel | |
| 2011/0076105 A1 | 3/2011 | Hideta | |
| 2012/0009034 A1 * | 1/2012 | Mack | B23B 51/02 408/226 |
| 2012/0076597 A1 * | 3/2012 | Krenzer | B23B 51/02 408/227 |
| 2012/0148358 A1 * | 6/2012 | Hecht | B23B 51/02 408/200 |
| 2012/0201619 A1 * | 8/2012 | Olsson | B23B 51/02 408/230 |
| 2013/0142583 A1 * | 6/2013 | Arai | B23B 51/02 408/229 |
| 2016/0214184 A1 * | 7/2016 | Krenzer | B23B 51/02 |
| 2016/0263664 A1 | 9/2016 | Son | |

FOREIGN PATENT DOCUMENTS

| | | | |
|---|---|---|---|
| DE | 102005012026 | 9/2006 | |
| DE | 102011001178 A1 * | 9/2012 | ............ B23B 51/02 |
| EP | 1 230 058 A1 | 8/2002 | |
| EP | 2390028 A1 * | 11/2011 | ............ B23B 51/02 |
| FR | 2793176 A1 * | 11/2000 | ............ B23B 51/02 |
| JP | 5676313 | 6/1981 | |
| JP | 57-071714 A * | 5/1982 | ............ B23B 51/02 |
| JP | 04-025308 A * | 1/1992 | ............ B23B 51/02 |
| JP | 06-320316 A * | 11/1994 | ............ B23B 51/00 |
| JP | 2003-025123 A * | 1/2003 | ............ B23B 51/00 |
| JP | 2003340626 | 12/2003 | |
| JP | 2005-001082 A * | 1/2005 | ............ B23B 51/06 |
| JP | 2005001082 | 1/2005 | |
| JP | 2005262348 | 9/2005 | |
| WO | WO9950014 A1 | 10/1999 | |
| WO | 2011/151155 A1 | 12/2011 | |
| WO | 2011151155 | 12/2011 | |
| WO | WO 2013065201 A1 * | 5/2013 | ............ B23B 51/02 |
| WO | 2014116575 | 7/2014 | |

* cited by examiner

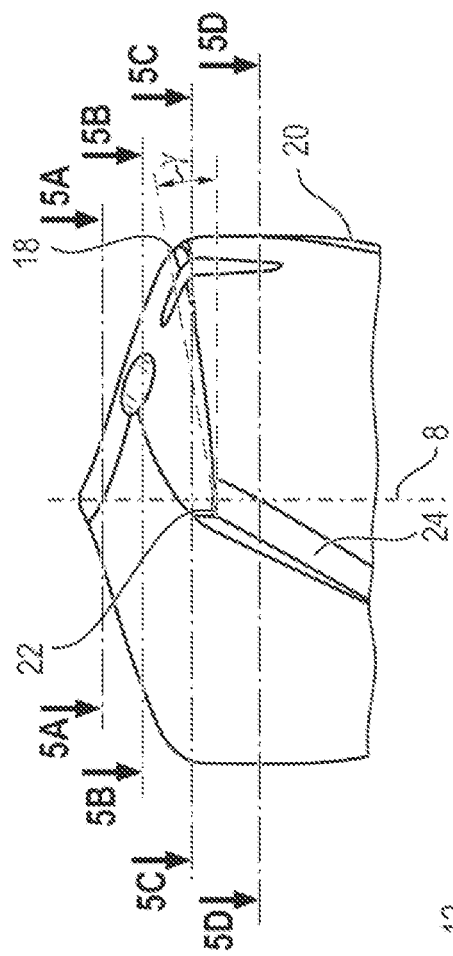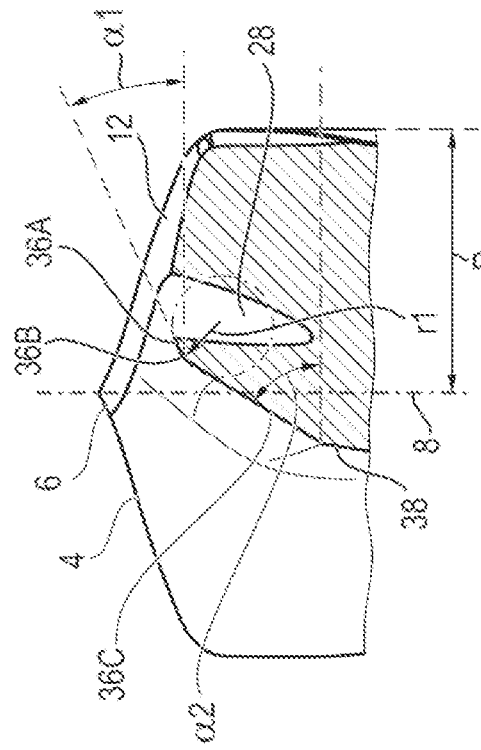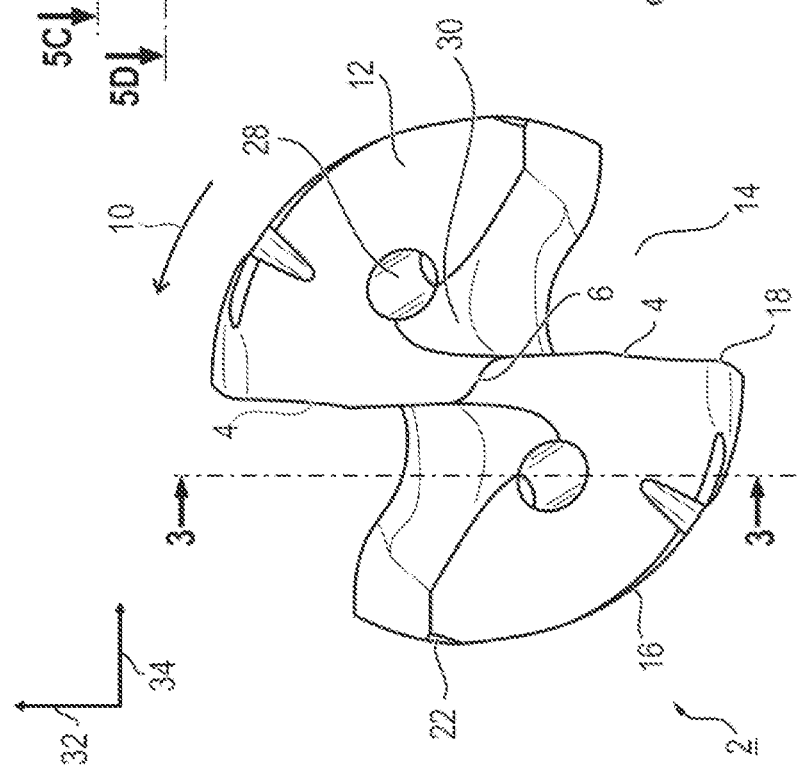

DRILL BIT

BACKGROUND OF THE INVENTION

The invention relates to a drill bit which extends along a center axis in the axial direction, comprising main cutting edges, which are connected to one another by a transverse cutting edge, comprising a tool flank adjoining each of the main cutting edges, which tool flank respectively merges into a chip flute, comprising an additional point thinning in the region of the transverse cutting edge, and comprising a drill back configured peripherally between the chip flutes.

A drill bit of this type can be derived, for instance, from WO 2011/151155 A1.

In drilling tools, the problem generally exists that in the center only an inadequate chip evacuation takes place, which, inter alia, leads also to higher cutting forces. This problem arises in the region of the transverse cutting edge. In order to reduce this problem, the so-called point thinning is known, by which, in the region of the transverse cutting edge, additional material is removed, so that an improved chip evacuation, in particular also in the region of the center, is obtained. The point thinning is usually made by an additional grinding operation, in that a grinding wheel is attached in the region of the transverse cutting edge to the end face of the drill bit.

Similarly, in a so-called four-face starting cut, in addition to the tool flank adjoining the respective main cutting edge, a further face with stronger inclination than the tool flank is ground. However, as a result of these additional grinding operations, edges, which are disturbing, are usually formed, in particular in the transition to the chip flute.

A drill bit in which, by a special grinding process, the tool flank merges homogeneously and without edges into the chip flute is described in EP 1 230 058 B1. By virtue of the special grinding process, the tool flank here descends steeply in the transition to the chip flute. An additional point thinning is in this case explicitly dispensed with. The special grinding process therefore replaces the otherwise customary point thinning, which is usually made by a second grinding step.

Object of the Invention

Starting from the above, the object of the invention is to define an improved drill bit.

Achievement of the Object

The object is achieved according to the invention by a drill bit having the features of claim 1. The drill bit can be configured both as an exchangeable drill bit in a modular drilling tool an as an integral component part of a monolithic drilling tool. The drill bit generally extends along a center axis in the axial direction and has main cutting edges, which are connected to one another by a transverse cutting edge. The main cutting edges here generally extend approximately in the radial direction from an outer corner to the transverse cutting edge. Preferably, as a result of the main cutting edge and the transverse cutting edge, a continuous, uninterrupted cutting edge, where appropriate with chip breaker grooves or chip breaker functionality, is configured. Preferably, two main cutting edges are configured. Each of the main cutting edges is adjoined by a tool flank, which respectively merges into a chip flute. The respective chip flute is continued in a shank region of the drilling tool and can extend, for instance, helically or else rectilinearly in the shank. Peripherally between the chip flutes is respectively configured a so-called drill back. In addition to the tool flank adjoining the respective main cutting edge, which tool flank is usually respectively made by a grinding process, a point thinning made in the end face of the drill bit. This point thinning is produced, in particular, by an additional grinding step. Usually, the point thinning is here ground into the already ground tool flank. In addition, it is provided that the point thinning extends in a principal direction leading from the tool flank in the direction of the chip flute and herein takes a convex course.

As a result of the convex transition, defined by the point thinning, from the tool flank into the chip flute, the point thinning, viewed in the principal direction, therefore in total assumes an approximately bulged or spherical shape. This measure yields the particular advantage that the point thinning is configured such that it descends steeply to the chip flute, so that a disturbing edge in the transition region from the point thinning to the chip flute, which edge could obstruct a chip flow, is avoided as far as possible.

Unlike in EP 1 230 058 B1, the point thinning is therefore made in the tool flank by an additional machining step. This yields the advantage that not the entire tool flank descends steeply toward the chip flute. At the same time, this means that a rear outer corner of the surface (tool flank and point thinning) adjoining the main cutting edge—viewed in the axial direction—is arranged at a position close to the tip.

At the rear end of the drill back, thus at that end of the drill back which is facing away from the cutting edge, a land is often configured as a web running along the chip flute, in order to improve the guidance of the drilling tool in a drill hole. The above-described measure yields the particular advantage that this land—compared with a drilling tool according to EP 1 230 058 B1—begins at an axially further forward position. As a result of this measure, the drilling tool is guided better at the start of the drilling operation. At the start of the drilling operation, the problem namely exists that the drilling tool, due to a lack of guidance, is easily tilted, which leads to inaccuracies. This problem is countered, inter alia, also with the arrangement of the additional land on the rear region of a respective drill back. As a result of the special drill point grinding according to EP 1 230 058 B1—in much the same way as in a four-face drill point grinding—this land is axially set back, however, with a wide spacing.

Particularly with inhomogeneous materials, such as, for instance, with grey cast iron, the lack of guidance at the start of the drilling operation is problematical, since, due to the inhomogeneities of the material, differences in material hardness exist within the workpiece to be machined, which differences can lead to an unwanted deflection of the drilling tool.

As a result of the measure proposed here, involving the convexly running point thinning formed additionally to the tool flank, on the one hand, in the center in the region of the transverse cutting edge, a large clearance angle is in total created, so that a simple chip evacuation is ensured. Furthermore, the transition into the chip flute is also fluid, so that, here too no, or hardly any, disturbing edges arise. Finally, as a result of this design, it is ensured that a land arranged on the back begins at an axially front position.

By "convexly running" is generally understood a bulged or spherical configuration. In much the same way as in a facet cut, the point thinning can be constituted by a plurality of straight surface portions, by curved surface portions in combination with straight surface portions, or else by a plurality of curved surface portions. The principal direction is generally defined by the direction from the tool flank toward the chip flute. In particular, the principal direction is defined by the tangent in the peripheral direction on the rear end of the drill back, which rear end is facing away from the outer corner. The principal direction is here typically oriented also parallel to the lagging main cutting edge, in particular to that portion of the main cutting edge which adjoins the transverse cutting edge.

In addition to the convex, thus spherical course of the point thinning, this, viewed in the transverse direction perpendicular to the principal direction, is configured such that it runs concavely, in particular is concavely curved. Viewed in the transverse direction, the point thinning therefore forms a cavity. In the grinding process, the curvature of the cavity is preferably formed by the radius of the grinding wheel with which the point thinning is made. The radius of the cavity is therefore at least similar to the radius of the grinding wheel (when the grinding wheel is tilted). As a result of the concavely curved cavity, in the region of the transverse cutting edge a particularly efficient thinning, and thus a large clearance angle, is obtained. The point thinning is therefore, in total, doubly curved, namely convexly in the principal direction and concavely in the transverse direction.

In a preferred embodiment, the tool flank extends from the main cutting edge, in particular from the outer corner, to the chip flute, thus in particular up to the land applied peripherally to the drill back, at a (mean) clearance angle ranging from only 5 to 20°. By mean clearance angle is here understood the angle of an imaginary line with respect to a horizontal plane oriented perpendicular to the axial direction, wherein the line connects the outer corner to the peripherally rear corner of the drill back in the transition to the chip flute (thus the axially foremost point of the land). In the course of the tool flank, the respective local clearance angle can definitely vary. As a result of this comparatively small mean clearance angle, it is ensured that the rear corner in the region of the land is located at a position situated axially as far forward as possible relative to the center point.

As a result, an only small axial distance is maintained between the outer corner and the rear corner. The tool flank here extends between the outer corner and the rear corner over an angular range, for instance, from 80° to 120° and, in particular, of approximately 100° in a configuration having two main cutting edges.

Furthermore, it is expediently provided that the point thinning, in the rear region at the transition into the chip flute, is radially distanced from the drill back, i.e. viewed in the radial direction, the tool flank adjoins the point thinning and remains on an axially front level in order specifically to ensure that the rear land engages in good time.

With regard to the design of the point thinning in the principal direction, this, in an expedient embodiment, has adjoining the tool flank a first surface portion, followed by a second, in particular convexly curved surface portion, and finally a third surface portion which opens out into the chip flute. The different surface portions are here characterized, in particular, also by different inclinations with respect to the horizontal plane perpendicular to the axial direction. Preferably, it is here provided that the third surface portion, which opens out into the chip flute, is in particular significantly steeper than the first surface portion. The point thinning therefore initially begins with a moderate inclination, so as later to descend very steeply toward the chip flute. Thus the surface portion which merges into the chip flute has an angle of inclination with respect to the horizontal plane which is greater, for instance by a factor of 1.5 to 2.5, than the corresponding angle of inclination of the first surface portion. Thus the angle of inclination of the first surface portion lies, for instance, ranging from 20° to 40°, and that of the last surface portion between, for instance, 50° and 70°. As a result of the steeply descending last (third) surface portion, the angular difference relative to the adjoining chip flute wall is kept as low as possible and is preferably only between 0° and 15°.

In an expedient embodiment, it is further provided that the point thinning, viewed in the principal direction, has surface portions running in a straight line, as well as in a curve. In particular, it is provided that the first and the third surface portion is configured in a straight line, and the intermediate second surface portion for procuring the different inclinations of the two contiguous surface portions is configured in a curve. In addition, in particular the transition from the third surface portion into the chip flute is preferably configured as a radius.

In an alternative preferred embodiment, the point thinning, in its principal direction, is continuously curved. It here preferably has different radii of curvature in order to imitate the desired course, namely initially descending shallowly and descending steeply toward the chip flute—via the various radii of curvature.

In order not to disturb the chip evacuation, in an expedient configuration the transition of the point thinning into the chip flute is configured at least largely without edges. The inclination of the point thinning therefore steadily transforms into the inclination of the chip flute. By inclination is here understood the orientation of the point thinning or of the chip flute wall in the principal direction with respect to the horizontal plane.

In an advantageous refinement, it is additionally provided that coolant ducts emerge on the end face from the drill bit, one coolant duct preferably being assigned to each main cutting edge. The point thinning here extends up to the opening of the coolant duct and at least partially encloses said opening. In particular, the openings are cut into by the point thinning, so that a larger clearance for the coolant discharge is obtained. As a result, the flow resistance for the discharge of the coolant is reduced and an improved coolant supply is ensured.

With a view to a good guidance of the drilling tool having such a drill bit, at the rear end of the drill back on the periphery, in a preferred embodiment, the aforementioned additional land, in particular in addition to a first land beginning at the outer corner and running along the chip flute, is formed. In principle, the drilling tool can be configured with one, two or more lands per main cutting edge.

DESCRIPTION OF THE FIGURES

An illustrative embodiment of the invention is described in greater detail below with reference to the figures, wherein:

FIG. 1 shows a top view of a drill bit having an axial cutting plane,

FIG. 2 shows a side view of the drill bit according to FIG. 1 having different horizontal cutting planes, FIG. 3 shows a sectional view of the drill bit in accordance with the sectional line 3-3 displayed in FIG. 1.

DESCRIPTION OF THE ILLUSTRATIVE EMBODIMENT

Figure 4A:
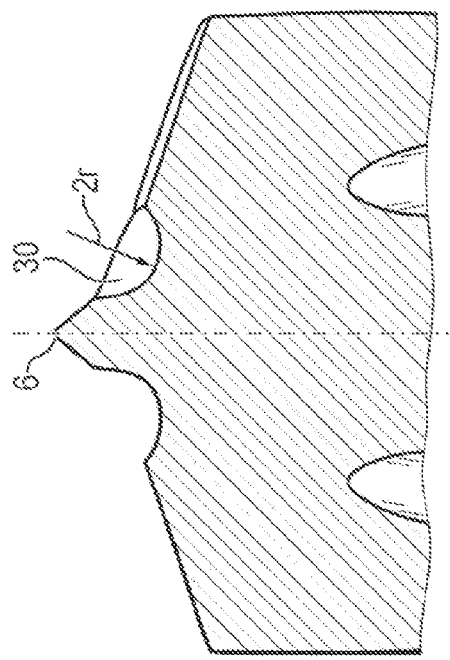
FIG. 4A shows the top view representation according to FIG. 1 of the drill bit having different axial cutting planes.

In the illustrative embodiment, the drill bit 2 represented in the figures has two main cutting edges 4, which are connected via an, in particular, approximately S-shaped transverse cutting edge 6. The drill bit 2 extends along a center axis 8 in the axial direction. At the same time, the center axis 8 defines a rotational axis. During drilling operation, the drill bit 2 rotates about the center axis 8 in the rotational direction 10. The drill bit 2 is configured rotationally symmetrically with respect to a 180° rotation about the center axis 8. In the case of more than two main cutting edges 4, the drill bit 2 typically has a 360° rotational symmetry. At variance with an exact rotational symmetry, a certain asymmetry, thus an unequal distribution, can also be provided.

The respective main cutting edge 4 is adjoined by a tool flank 12, which is arranged at a (mean) clearance angle γ to a horizontal plane perpendicular to the center axis 8 (FIG. 2).

The foremost point of the drill bit 2 is defined by a tip, situated on the center axis 8, of the transverse cutting edge 6. In the illustrative embodiment, the tool flanks 12, starting from the cross sections, descend toward the periphery in the manner of a conical surface.

Ahead of a respective main cutting edge 4 is configured a chip flute 14, which extends in the axial direction. On the periphery, the so-called drill back 16 is configured between successive chip flutes 4. The end face of the drill bit 2 is therefore configured, in total, approximately conically, with recesses for the chip flutes.

At the radially outer point, the respective main cutting edge 4 merges into a respective outer corner 18. This is adjoined at the periphery, thus at the front end of the respective drill back 16, by a first land 20, which runs along a secondary cutting edge (not represented in detail here), and thus along the chip flute 14.

The tool flank 12 extends on the periphery from the outer corner 18 to a rear corner 22, at which the tool flank merges, with the formation of an edge, into the chip flute 14. On the drill back 16, starting from this rear corner 22, is configured a second land 24, which runs along the chip flute 14.

In addition, coolant ducts 28 are configured in the drill bit, which emerge on the end face via openings.

By a separate grinding operation, a point thinning 30, which serves for the thinning of, thus the removal of material from, the drilling center in the region of the transverse cutting edge 6, is made in the tool flank 12 to enable efficient chip evacuation in the region of the transverse cutting edge 6.

Figure 4B:
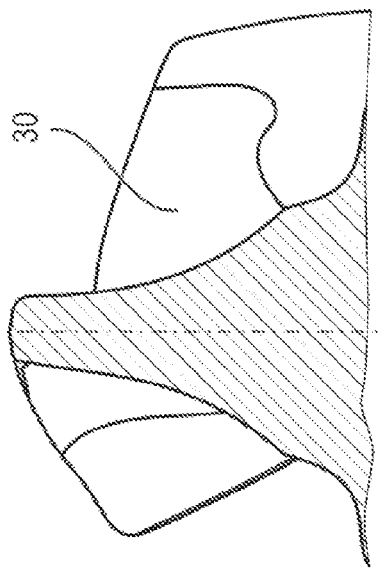
FIG. 4B shows a sectional view of the drill bit according to the sectional line 4B-4B in FIG. 4A.
Figure 4C:
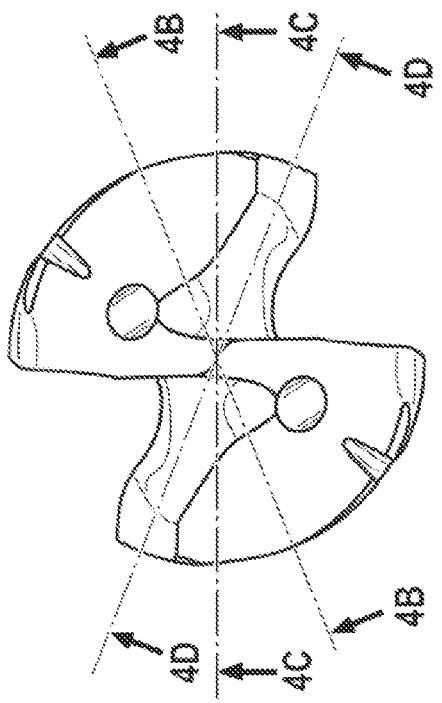
FIG. 4C shows a sectional view of the drill bit in accordance with the sectional line 4C-4C in FIG. 4A.
Figure 4D:
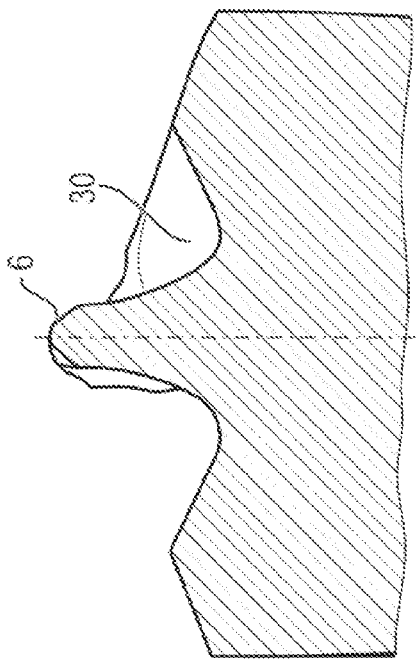
FIG. 4D shows a sectional view of the drill bit along the cutting plane 4D-4D in FIG. 4A, FIGS. 5A-D show various sectional top views of the drill bit according to the horizontal cutting planes 5A-5A, 5B-5B, 5C-5C, 5D-5D according to FIG. 2.
Figure 5A:
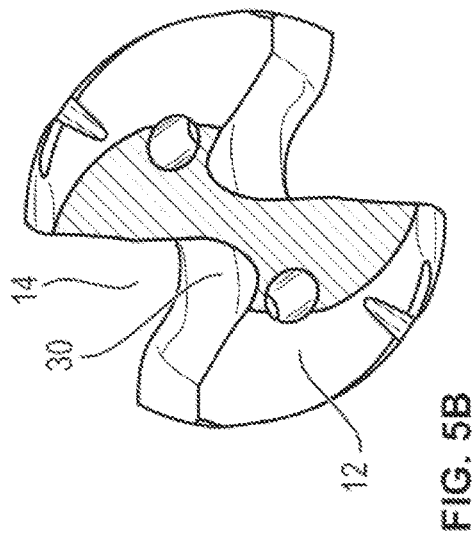
Figure 5B:
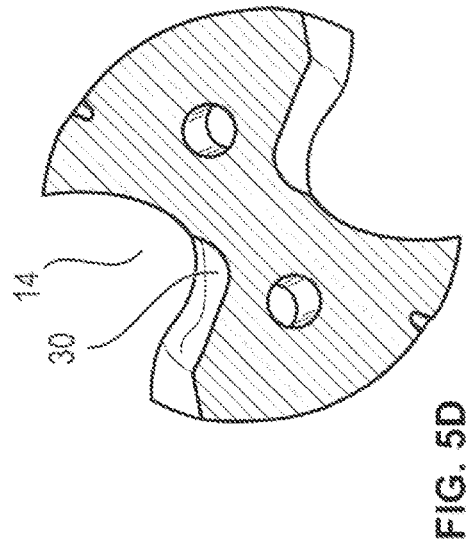
Figure 5C:
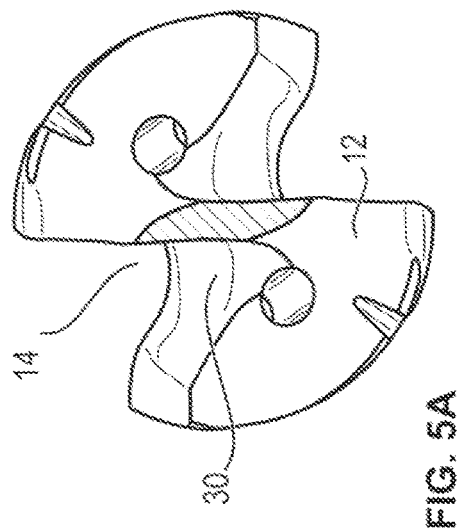
Figure 5D:
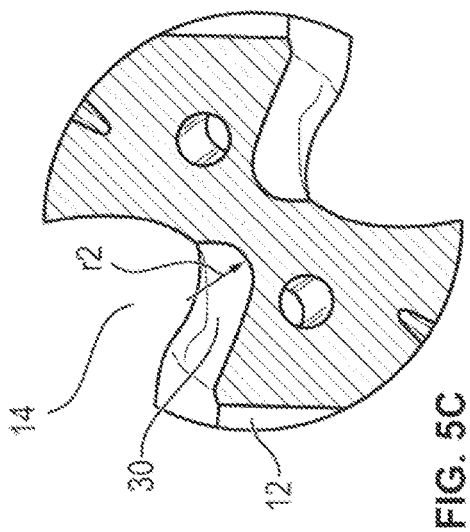

This point thinning 30 is made in the tool flank 12 by a separate grinding operation and extends along a principal direction 32 (cf. FIG. 1) from the tool flank 12 to the chip flute 14. As can be seen, in particular, from the sectional representation of FIG. 3, the point thinning 30 runs spherically, thus convexly, in the principal direction 32. At the same time, the point thinning has in a transverse direction 34 (cf. FIG. 1) perpendicular to the principal direction a concave course and therefore forms a cavity in the transverse direction 34 (cf., for example, FIGS. 4B-4D). The point thinning 30 is therefore configured, in total, in the manner of a doubly curved surface.

As can be seen, in particular, from FIG. 3, the point thinning, viewed in the principal direction 32, is formed from a plurality of surface portions 36A-C. In the illustrative embodiment, these are three portions in total, namely a first surface portion 36A, which extends in a straight line in the principal direction 32 at an angle of inclination α1 with respect to a horizontal plane, a second surface portion 36B, formed by a first radius r1, and a third surface portion 36C, which in turn is oriented in a straight line at a second angle of inclination α2. In the illustrative embodiment, the first angle of inclination α1 and the second angle of inclination α2 lies in the region of about 60°. These two angles of inclination generally differ, for instance, by a factor of 1.5 to 2.5. The third surface portion 36C is therefore oriented significantly more steeply than the first surface portion 36A, so that an as far as possible homogeneous transition into the adjoining chip flute wall 38 is achieved. In order to ensure an edge-free transition, the transition from the third surface portion 36C into the chip flute wall 38 is rounded via a radius. The first radius r1 of the middle, second surface portion 36B lies preferably within the range of 0.1 to 4 times the nominal radius R of the drill bit 2 (FIG. 3).

As is evident, in particular, from FIGS. 4A to 4D, as a result of the concave cavity in the transverse direction 34, a thinning of the drilling center in the region of the transverse cutting edge 6 is achieved. The cavity here has a second radius r2, which is comparable to the first radius r1 and ranges, for instance, between 0.1 and 0.4 times the nominal radius R.

With reference to the sectional images according to FIGS. 5A-5D, the cross-sectional surfaces of the drill bit 2 on different axial contour lines are evident. It is here clear that the point thinning 30 is recessed into the tool flank 12, thus is set back from the latter respectively in the axial direction. At the height level of the rear corner 22, the point thinning 30 is therefore continued still further in the axial direction toward the chip flute 14, as is evident, in particular, with reference to the representation according to FIG. 5D. Given an imaginary radial line starting from the center axis 8, the point thinning 30 therefore lies respectively axially set back in comparison to the respective sectional plane through the tool flank 12.

As can be seen, in particular, also from FIG. 1, the coolant ducts 28 are partially cut into by the point thinning 30, i.e. the point thinning extends into the openings of the coolant ducts 28. As a result, an improved coolant discharge with lower flow resistance is obtained.

The invention claimed is:

1. A drill bit which extends along a center axis in an axial direction comprising:
   main cutting edges which are connected to one another by a transverse cutting edge;
   a chip flute associated with each main cutting edge;
   a tool flank adjoining each of the main cutting edges, wherein each tool flank respectively merges into one of the chip flutes;
   a recessed point thinning in the region of the transverse cutting edge; and
   a drill back which extends peripherally between two chip flutes;
   wherein the point thinning, along a principal direction, extends from the tool flank and descends into the chip flute via an edge-free convex course;
   wherein the principal direction is defined as a radial direction with respect to the center axis and is roughly parallel to at least one of the main cutting edges.

2. The drill bit as claimed in claim 1, wherein the point thinning, with respect to a transverse direction which is perpendicular to the principal direction and to the center axis, is concavely curved.

3. The drill bit as claimed in claim 1, wherein each tool flank extends from one of the main cutting edges to the chip flute at a mean clearance angle in a range from 5 to 20°.

4. The drill bit as claimed in claim 1, wherein the point thinning, at the transition into the chip flute, is radially distanced from the drill back.

5. The drill bit as claimed in claim 1, wherein the point thinning has, starting at the tool flank, a first surface portion, followed by a second surface portion, and finally a third surface portion, wherein the third surface portion opens out into the chip flute.

6. The drill bit as claimed in claim 5, wherein:
the first, second and third surface portions, with respect to the principal direction, descend variously steeply to the chip flute; and
the third surface portion is steeper, with respect to the principal direction, than the first surface portion.

7. The drill bit as claimed in claim 1, wherein the point thinning, with respect to the principal direction, includes at least one surface portion extending in a straight line, and includes at least one surface portion extending in a curved line.

8. The drill bit as claimed in claim 1, wherein the point thinning, with respect to the principal direction, is continuously curved.

9. The drill bit as claimed in claim 1, further comprising coolant ducts emerging on an end face of the drill bit, wherein the point thinning extends respectively up to one of the coolant ducts and at least partially encloses the one of the coolant ducts.

10. The drill bit as claimed in claim 1, further comprising a second land disposed at the end of the drill back which is facing away from the main cutting edge.

* * * * *